(12) United States Patent
Luo (10) Patent No.: US 12,122,199 B1
(45) Date of Patent: Oct. 22, 2024

(54) TOW HOOK DEVICE

(71) Applicant: Xiaoyao Luo, Bazhong (CN)

(72) Inventor: Xiaoyao Luo, Bazhong (CN)

( * ) Notice: Subject to any disclaimer, the term of this patent is extended or adjusted under 35 U.S.C. 154(b) by 0 days.

(21) Appl. No.: 18/644,174

(22) Filed: Apr. 24, 2024

(30) Foreign Application Priority Data

Apr. 1, 2024 (CN) .......................... 202420658113.X (51) Int. Cl.
- *B60D 1/06* (2006.01)
- *B60D 1/07* (2006.01)
- *B60D 1/46* (2006.01)
- *B60D 1/60* (2006.01)

(52) U.S. Cl.
CPC .................. *B60D 1/06* (2013.01); *B60D 1/07* (2013.01); *B60D 1/46* (2013.01); *B60D 1/60* (2013.01)

(58) Field of Classification Search
CPC ... B60D 1/06; B60D 1/07; B60D 1/46; B60D 1/60
See application file for complete search history.

(56) References Cited

U.S. PATENT DOCUMENTS

| | | | |
|---|---|---|---|
| 2009/0267323 A1* | 10/2009 | Belinky | B60D 1/52 280/511 |
| 2016/0243909 A1* | 8/2016 | Harper | B60D 1/06 |
| 2017/0334255 A1* | 11/2017 | McAllister | G01G 5/006 |
| 2019/0315168 A1* | 10/2019 | Rotenberg | B60D 1/52 |
| 2020/0384817 A1* | 12/2020 | Anderson | B60D 1/248 |
| 2022/0001709 A1* | 1/2022 | Perotti | B60D 1/52 |

* cited by examiner

*Primary Examiner* — Kevin Hurley
*Assistant Examiner* — Marlon A Arce
(74) *Attorney, Agent, or Firm* — WPAT, P.C (57) ABSTRACT

A tow hook device includes a tow ball body, a tow ball hitch and a tow arm. The tow ball body includes at least one tow ball and a tow ball rod connected to the at least one tow ball, and the tow ball body further includes at least one plunger disposed on the tow ball rod. The tow ball hitch is connected to the tow ball body by the at least one plunger. The tow ball hitch is fixedly connected to the tow arm. The tow hook device has a reasonable structure, great practicality, flexible installment and disassembly, convenient use and improved work efficiency.

9 Claims, 6 Drawing Sheets

TOW HOOK DEVICE

TECHNICAL FIELD

The disclosure relates to the technical field of towable recreational vehicle (RV) connecting devices, and more particularly to a tow hook device.

BACKGROUND

A towable RV has no independent drive system, and need to be connected to a towing vehicle via a connecting device for driving force provided by the towing vehicle.

A structure of the connecting device directly affects stability of a connection between the towable RV and the towing vehicle. Current trailer hooks of the connecting device are generally fixed on a rear bar of the towing vehicle, and bearing capacity of the trailer hook is concentrated at a point of the rear bar of the towing vehicle, leading to low stability of the connecting device.

In the related art, some tow hook devices include a towing ball body and a towing arm, the towing arm defines a vertical groove. The towing ball body is disposed in the vertical groove, and then connected to two sides of the vertical groove through a pin shaft, resulting in an unreasonable structure. Installation and disassembly of the tow hook device is not flexible enough, and it is inconvenient to use the tow hook device, resulting in a long time of the installation and the disassembly and low work efficiency

SUMMARY

The disclosure aims at providing a tow hook device with a reasonable structure, great practicality, flexible installment and disassembly, convenient use and improved work efficiency.

To achieve above purposes, the disclosure provides the tow hook device, including a tow ball body, a tow ball hitch and a tow arm. The tow ball body includes at least one tow ball. The tow ball body further includes a tow ball rod connected to the at least one tow ball, and at least one plunger disposed on the tow ball rod. The tow ball hitch is connected to the tow ball body by the at least one plunger, and the tow ball hitch is fixedly connected to the tow arm.

In an embodiment, the at least one tow ball includes a first tow ball and a second tow ball, the first tow ball is disposed on an end of the tow ball rod, and the second tow ball is disposed on another end of the tow ball rod.

In an embodiment, the tow ball hitch defines a through hole, a diameter of the tow ball rod corresponds to a size of the through hole, an inner wall of the tow ball hitch surrounding the through hole defines at least one round hole, a position of the at least one plunger corresponds to a position of the at least one round hole, and the tow ball body passes through the through hole and is connected to the tow ball hitch by the at least one plunger.

In an embodiment, the at least one plunger includes a first plunger and a second plunger, and the first plunger and the second plunger are disposed on two sides of the tow ball rod respectively.

In an embodiment, the first plunger includes a first spring inside and the second plunger includes a second spring inside.

In an embodiment, the tow ball hitch includes a clamping jaw disposed at a front end of the tow ball hitch, the tow ball hitch is connected to the tow arm by the clamping jaw.

In an embodiment, the tow ball hitch is provided with at least one latch, and the tow ball hitch is fixedly connected to the tow arm by the at least one latch.

In an embodiment, the tow hook device further includes a latch cover, and the at least one latch is disposed on the latch cover.

In an embodiment, a number of the at least one latch is in a range of 1-3, and the latch cover is provided with a lock body.

In an embodiment, the tow ball arm is provided with a receiver latch lock.

The disclosure has below beneficial effects.

The disclosure provides the tow hook device, including the tow ball body and the tow ball hitch, and the tow ball body includes the at least one tow ball. The tow ball body further includes the tow ball rod and the at least one plunger disposed on the tow ball rod.

The tow ball hitch is connected to the tow ball rod by the at least one plunger, and the tow ball hitch is fixedly connected to the tow arm.

According to above structural settings, the installation and disassembly of the tow hook device is more flexible and convenient, and the structure of the tow hook device is more reasonable, improving work efficiency.

The disclosure has great practicality, safety, high reliability and is suitable for widespread promotion and use.

BRIEF DESCRIPTION OF DRAWINGS

In order to more clearly illustrate technical solutions in embodiments of the disclosure or related art, accompanying drawings in the embodiments or the related art are briefly introduced below, and it is apparent that the accompanying drawings in the following description are only some of the embodiments of the disclosure, and that other drawings can be obtained according to structures illustrated in the accompanying drawings by those skilled in the art without creative labor.

Realization of purposes, functional features and advantages of the disclosure will be further described in connection with the embodiments and with reference to the accompanying drawings.

DETAILED DESCRIPTION OF EMBODIMENTS

Technical solutions in embodiments of the disclosure will be clearly and completely described below in conjunction with the accompanying drawings in the embodiments of the disclosure, and it is clear that the described embodiments are only a part of the embodiments of the disclosure, and not all of the embodiments. Based on the embodiments in the disclosure, all other embodiments obtained by those skilled in the art without creative labor fall within the scope of protection of the disclosure.

It should be noted that all direction indications (such as up, down, left, right, forth and back) in the embodiments of the disclosure are only used to explain relative positional relationship, movement, etc., among various components in a particular attitude (as shown in the accompanying drawings), and that the direction indications are correspondingly changed in an event of a change in that particular attitude.

In the disclosure, unless otherwise expressly specified and limited, terms, such as "connected" and "fixed", etc. should be understood in a broad sense, e.g., "fixed" can be a fixed connection, a removable connection or a one-piece connection; it can be a mechanical connection or an electrical connection; it can be a direct connection or an indirect connection through an intermediate medium; it can be a connection within two elements or an interaction between two elements. Unless expressly limited otherwise, for those skilled in the art, specific meanings of above terms in the disclosure may be understood on a case-by-case basis.

In addition, if there are descriptions related to "first" and "second" etc. in the embodiments of the disclosure, such descriptions are only for descriptive purposes and cannot be understood as indicating or implying their relative importance or implying the number of indicated technical features. Therefore, features defined with "first" and "second" can explicitly or implicitly include at least one of these features. In addition, the meaning of "and/or" appearing throughout the disclosure includes three parallel schemes. Taking "A and/or B" as an example, it includes a scheme A, or a scheme B, or a scheme that both A and B satisfy. Furthermore, the technical solutions of various embodiments can be combined with each other, but must be based on that those skilled in the art can achieve. When the combination of the technical solutions conflicts with each other or cannot be achieved, it should be considered that the combination of the technical solutions does not exist and is not within the scope of protection claimed by the disclosure The disclosure provides a tow hook device.

Embodiment 1

Figure 1:
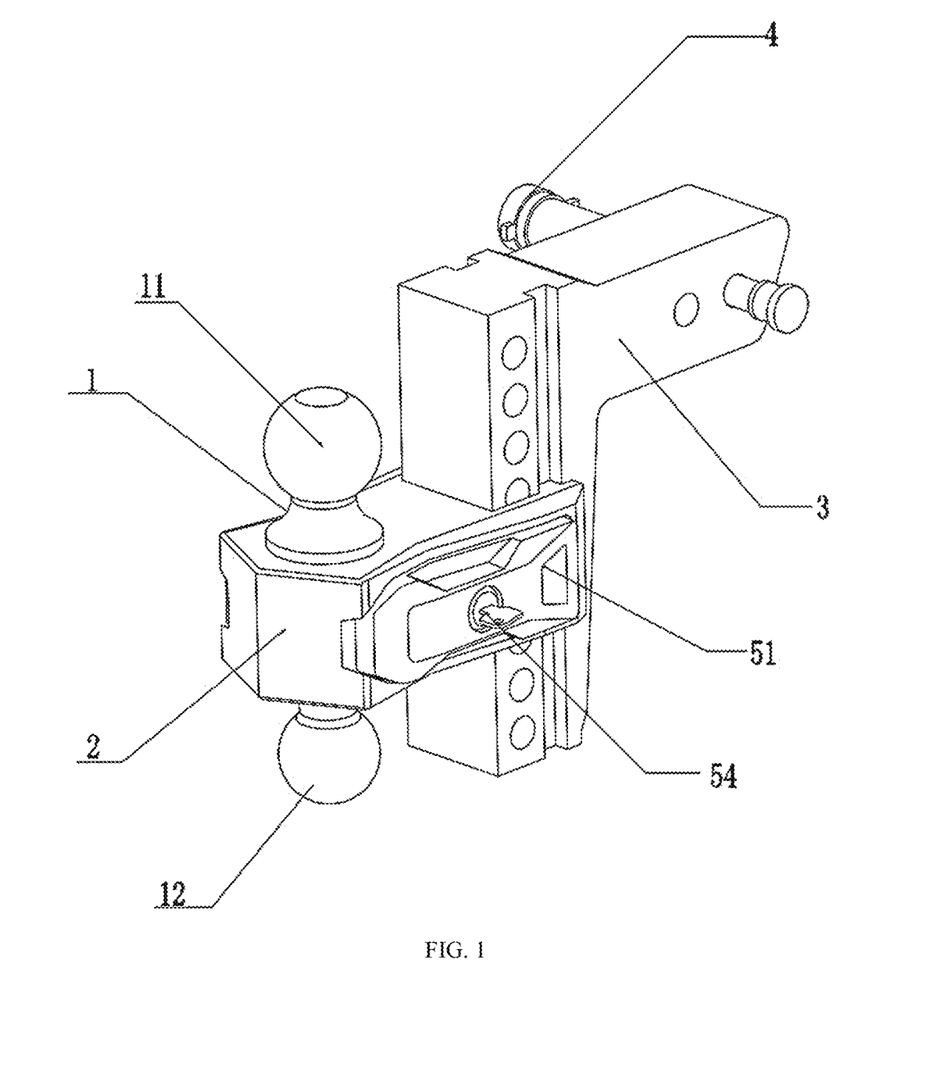
FIG. 1 illustrates a schematic structural diagram of a tow hook device according to an embodiment of the disclosure.
Figure 2:
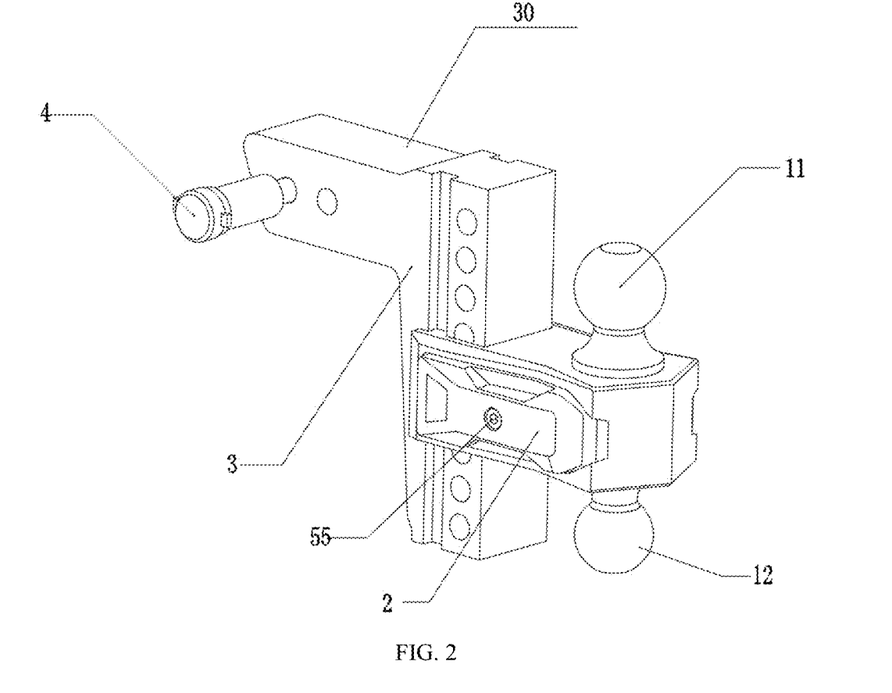
FIG. 2 illustrates another schematic structural diagram of the tow hook device according to the embodiment of the disclosure.
Figure 3:
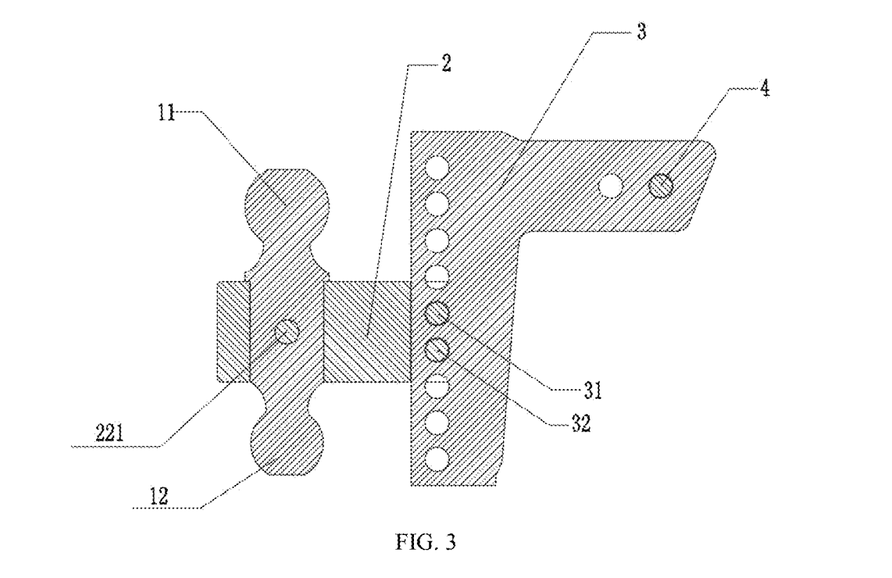
FIG. 3 illustrates a sectional view of the tow hook device according to the embodiment of the disclosure.
Figure 4:
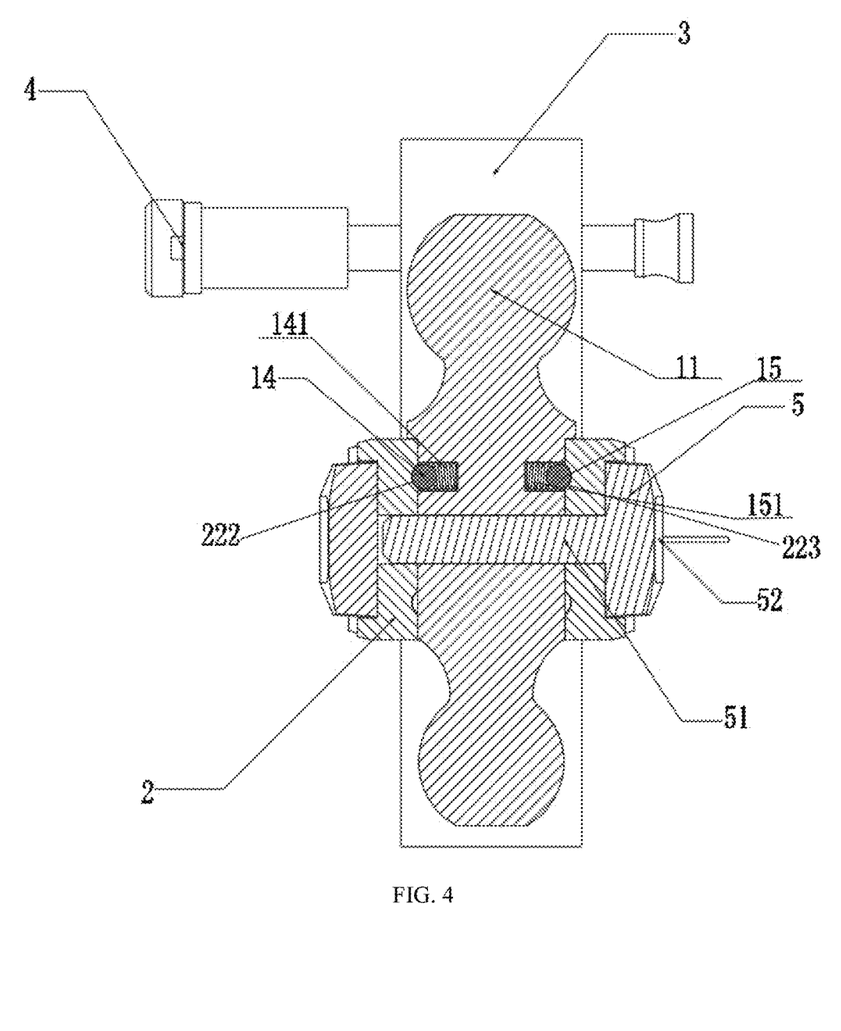
FIG. 4 illustrates another sectional view of the tow hook device according to the embodiment of the disclosure.
Figure 5:
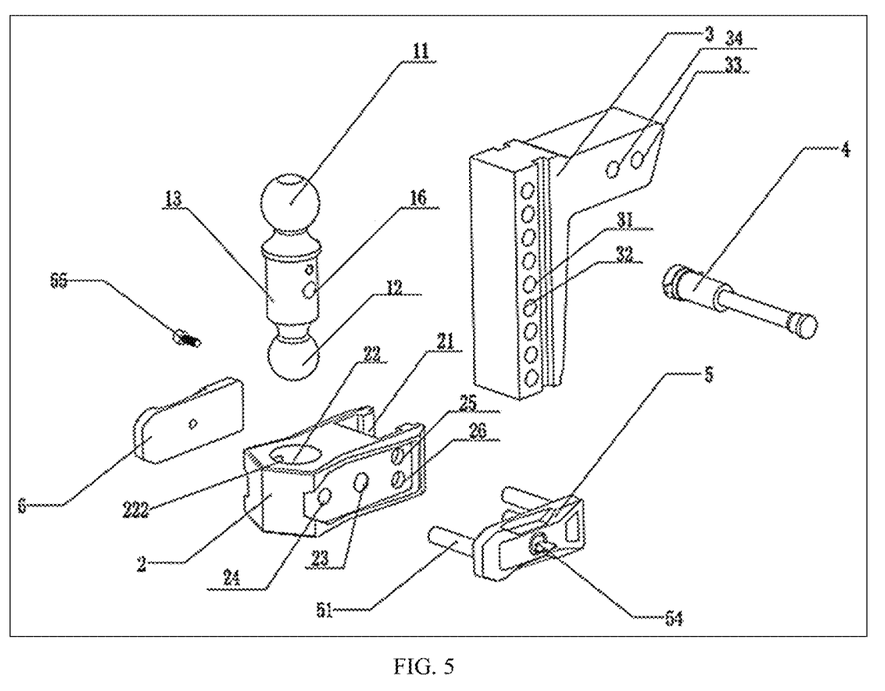
FIG. 5 illustrates a schematic exploded view of the tow hook device according to the embodiment of the disclosure.
Figure 6:
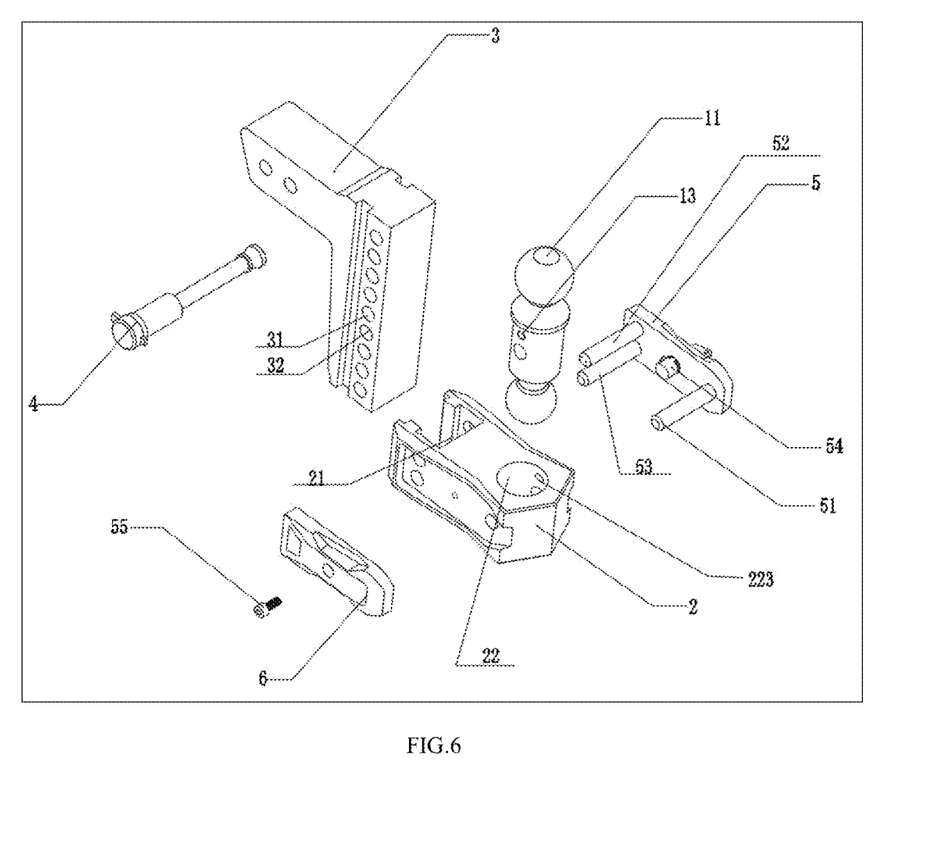
FIG. 6 illustrates another schematic exploded view of the tow hook device according to the embodiment of the disclosure.
Figure 7:
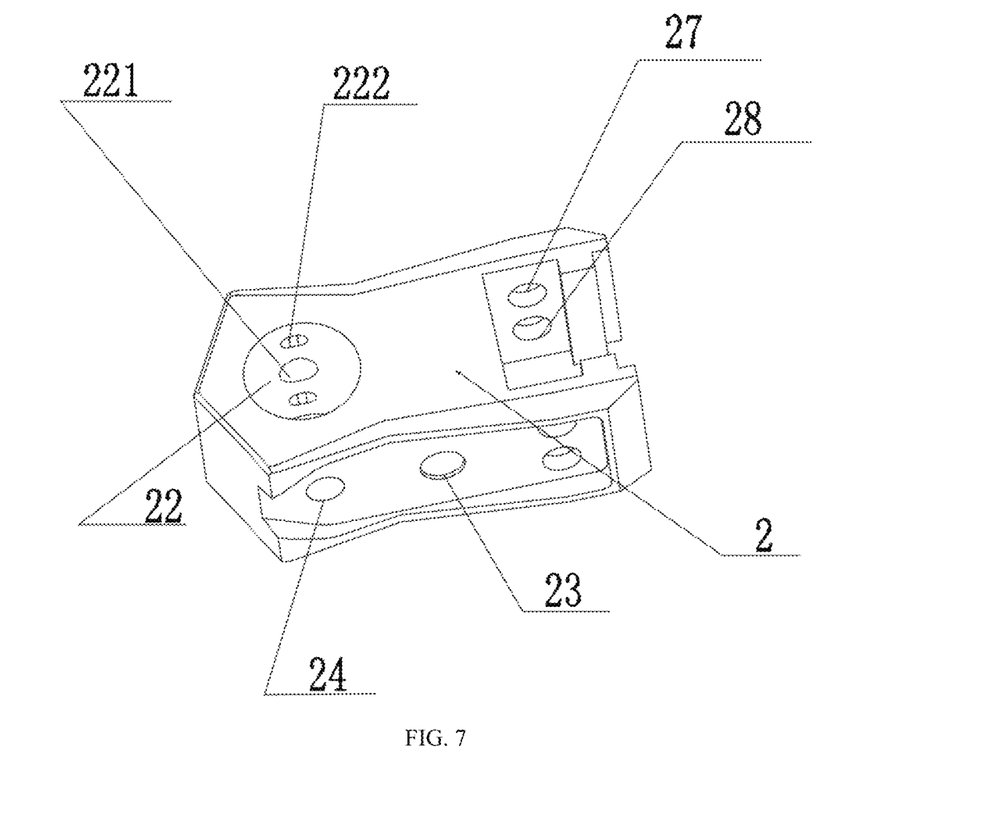
FIG. 7 illustrates a schematic structural diagram of a tow ball hitch of the tow hook device according to the embodiment of the disclosure.

Referring to FIG. 1 to FIG. 7, in an embodiment of the disclosure, the tow hook device includes a tow ball body 1, a tow ball hitch 2 and a tow arm 3. The tow ball body 1 includes a first tow ball 11. In some embodiments, the first tow ball 11 is used to connect another vehicle to transmit automobile traction. The tow ball hitch 2 is used to connect the tow arm 3 and the first tow ball 11.

The tow ball body 1 further includes a tow ball rod 13 connected to the first tow ball 11, and a first plunger 14 disposed on the tow ball rod 13.

The first tow ball 11 is connected to the tow ball hitch 2 by the first plunger 14, and the tow ball hitch 2 is fixedly connected to the tow arm 3.

In the embodiment, the tow ball body 1 further includes a second tow ball 12, the first tow ball 11 is disposed on an end of the tow ball rod 13, and the second tow ball 12 is disposed on another end of the tow ball rod 13.

In the embodiment, the tow ball body 1 includes two tow balls, i.e., the first tow ball 11 and the second tow ball 12, the first tow ball 11 and the second tow ball 12 can be disposed up and down along the tow ball rod 13 separately. Of course, according to actual needs, the tow ball body 1 may be provided with multiple tow balls. The tow balls are used to connect a towing device of a RV.

Referring to FIG. 3 to FIG. 7, in the embodiment, the tow ball hitch 2 defines a through hole 22, a diameter of the tow ball rod 13 corresponds to a size of the through hole 22, an inner wall of the tow ball hitch 2 surrounding the through hole 22 defines a first round hole 221, and the inner wall of the tow ball hitch 2 define a second round hole 222 and a third round hole 223. In an alternative embodiment, the second round hole 222 and the third round hole 223 are separately disposed at upper and lower sides of the first round hole 221. An outer wall of the tow ball hitch 2 defines a fourth round hole 24. A position of the first round hole 221 corresponds to a position of the fourth round hole 24. A position of the first plunger 14 corresponds to a position of the second round hole 222, the first plunger 14 is disposed inside the second round hole 222, and the tow ball body 1 passes through the through hole 222 and is connected to the tow ball hitch 2 by the first plunger 14.

In the embodiment, a surface of the tow ball hitch 2 defines the through hole 22, the tow ball body 1 passes through the through hole 22, and the first tow ball 11 and the second tow ball 12 are disposed on upper and lower sides of the tow ball hitch 2 separately. The tow ball body 1 passes through the through hole 22 and is snap-fitted with the tow ball hitch 2 by the first plunger 14.

In the embodiment, furthermore, the tow ball body 1 includes the first plunger 14 and a second plunger 15 disposed on the tow ball rod 13, the first plunger 14 is disposed on a side of the tow ball rod 13, and the second plunger 15 is disposed on another side of the tow ball rod 13. The tow ball body 1 passes through the through hole 22 and is snap-fitted with the tow ball hitch 2 by the first plunger 14 and the second plunger 15.

In the embodiment, the inner wall of the tow ball hitch 2 surrounding the through hole 22 defines the second round hole 222 and the third round hole 223. Positions of the second round hole 222 and the third round hole 223 correspond to positions of the first plunger 14 and the second plunger 15 respectively. When the tow ball body 1 passes through the through hole 22 and is inserted in the tow ball hitch 2 by the through hole 22, the first plunger 14 and the second plunger 15 are disposed inside the second round hole 222 and the third round hole 223 separately to make the tow ball body 1 snap-fitted with the tow ball hitch 2.

Of course, according to the actual needs, the tow ball body 1may include multiple plungers disposed on the tow ball rod 13 to make the snap fit between the tow ball body 1 and the tow ball hitch 2 closer.

In the embodiment, furthermore, the first plunger 14 includes a first spring 141 inside, and the second plunger 15 includes a second spring 151 inside. When the tow ball body 1 passes through the through hole 22 and is inserted in the tow ball hitch 2 by the through hole 22, the first plunger 14 and the second plunger 15 are disposed inside the second round hole 222 and the third round hole 223 separately, and the first spring 141 presses the first plunger 14 and the second spring 151 presses the second plunger 15 to make the tow ball body 1 snap-fitted with the tow ball hitch 2, making use of the tow hook device more reliable and safer.

If the tow ball body 1 is to be removed from the tow ball hitch 2, the tow ball body 1 is simply twisted to press the first spring 141 and the second spring 151 to make the first plunger 14 and the second plunger 15 separated from the second round hole 222 and the third round hole 223 respectively. In this way, the tow ball body 1 is removed from the tow ball hitch 2 and the tow ball body 1 is easily removed from the tow ball hitch 2, making the use of the tow hook device more convenient and installation and disassembly of the tow hook device more flexible.

In the embodiment, the first plunger 14 and the second plunger 15 are used to fix positions of the tow ball hitch 2 and the tow ball body 1, making a latch connect more easily to the tow ball hitch 2 and the tow ball body 1 without finding directions, and when reversing up and down directions of the tow ball body 1, or pulling out the latch, the tow ball body 1 cannot fall from the tow ball hitch 2.

If the latch is not fixed on the tow ball hitch 2, when a vertical force is applied to the tow ball body 1, the first plunger 14 and the second plunger 15 are pressed, and the tow ball body 1 may be removed from the tow ball hitch 2, making it convenient for a user to change a tow ball and the use of the tow hook device safer.

Embodiment 2

Referring to FIG. 1 to FIG. 7, in this embodiment, the tow ball hitch 2 includes a clamping jaw 21 disposed at a front end of the tow ball hitch 2, and the tow ball hitch 2 is connected to the tow arm 3 by the clamping jaw 21.

In the embodiment, the tow ball hitch 2 is fixedly connected to the tow arm 3 by the clamping jaw 21, making the use of the tow hook device more stable and safer.

In the embodiment, furthermore, the tow ball hitch 2 is provided with a first latch 51, and the tow ball body 1 is connected to the tow ball hitch 2 by the first latch 51.

In the embodiment, furthermore, the tow ball hitch 2 is further provided with a second latch 52 and a third latch 53. The tow ball hitch 2 is fixedly connected to the tow arm 3 by the second latch 52/the third latch 53.

In the embodiment, the second latch 52 and the third latch 53 may be disposed in positions corresponding to the clamping jaw 21. Two sides of the clamping jaw 21 define a fifth round hole 25 and a sixth round hole 27 separately. The tow arm 3 defines a first tow arm hole 31. When positions of the fifth round hole 25 and the sixth round hole 27 correspond to a position of the first tow arm hole 31, the second latch 52 passes through the fifth round hole 25, the first tow arm hole 31 and the sixth round hole 27, making the tow ball hitch 2 connected to the tow arm 3.

In the embodiment, the tow arm 3 is configured to connect to a vehicle receiver and the tow ball hitch 2. The tow ball body 1 may define multiple holes to fix and adjust distance from the tow ball hitch 2 to ground, making the tow ball body 1 be more easily adapted to other vehicles to be towed at different heights, and limiting translation of the tow ball hitch 2 at left and right directions. The second latch 52 is inserted through the fifth round hole 25 and the sixth round hole 27, limiting translation of the tow ball hitch 2 and the tow ball body 1 at up, down, forth and back directions.

In the embodiment, the tow hook device further includes a latch cover 5.

In the embodiment, furthermore, the latch cover 5 may be provided with the first latch 51, or the first latch 51 and the second latch 52, or the first latch 51, the second latch 52 and the third latch 53. According to the actual needs, the latch cover 5 may be provided with multiple latches, and the latch cover 5 may be disposed on a side of the tow ball hitch 2.

The two sides of the clamping jaw 21 define the fifth round hole 25 and the sixth round hole 27, a seventh round hole 26 and an eighth round hole 28. The tow arm 3 may define the first tow arm hole 31 and a second tow arm hole 32. The positions of the fifth round hole 25 and the sixth round hole 27 correspond to the position of the first tow arm hole 31, and positions of the seventh round hole 26 and the eighth round hole 28 correspond to a position of the second tow arm hole 32. The second latch 52 passes through the fifth round hole 25, the first tow arm hole 31 and the sixth round hole 27, and the third latch 53 passes through seventh round hole 26 and the second tow arm hole 32 and the eighth round hole 28 to connect the tow ball hitch 2 to the tow arm 3.

In the embodiment, a side of the tow ball hitch 2 may define a ninth round hole 23. The tow ball rod 13 defines a first rod hole 16. A position of the fourth round hole 24 corresponds to a position of the first rod hole 16, and a position of the first latch 51 corresponds to the position of the fourth round hole 24. The first latch 51 passes through the fourth round hole 24, the first rod hole 16 and the first round hole 221 to connect the latch cover 5 to the tow ball body 1.

The latches in the embodiment are used to connect the tow ball hitch 2, the tow ball body 1 and the tow arm 3, and to limit the translation of the tow ball hitch 2 and the tow ball body 1 at the up, down, forth and back directions. The latches play a fixed role and make the use of the tow hook device more reliable and safer.

In the embodiment, the latch cover 5 is provided with a lock body 54. The lock body 54 is used to connect the latch cover 5 to the tow ball hitch 2, making the tow hook device have an anti-theft function. A position of the lock body 54 corresponds to a position of the ninth round hole 23. The lock body 54 passes through the ninth round hole 23 to connect the first latch cover 5 to the tow ball hitch 2.

In the embodiment, the tow hook device further includes a latch cover 6 disposed on another side of the tow ball hitch 2. The latch cover 6 is fixedly connected to the another side of the tow ball hitch 2 by a screw 55.

Referring to FIG. 2 and FIG. 4 to FIG. 6, in the embodiment, the tow arm 32 is provided with a receiver latch lock 4.

In the embodiment, the tow arm 32 is provided with a square steel 30, a side wall of the square steel 30 may define a tenth round hole 33 and an eleventh round hole 34. The square steel 30 is provided with the receiver latch lock 4 to be connected to a RV receiver.

The receiver latch lock 4 may be inserted through the tenth round hole 33 or the eleventh round hole 34. The receiver latch lock 4 is used to connect and lock the tow arm 3 to the vehicle receiver, and to make the tow hook device have the anti-theft function.

The disclosure has a reasonable structure, great practicality, flexible installment and disassembly, convenient use and improved work efficiency.

Above is only optional embodiments of the disclosure, and is not intended to limit the scope of the patent of the disclosure, and any equivalent structural transformations made by utilizing contents of the specification and the accompanying drawings of the disclosure or directly/indirectly applied in other related art, under the invention concept, is included in the scope of the patent protection of the disclosure.

What is claimed is:

1. A tow hook device, comprising: a tow ball body, a tow ball hitch and a tow arm,
  wherein the tow ball body comprises: at least one tow ball;
  wherein the tow ball body further comprises a tow ball rod connected to the at least one tow ball and at least one plunger disposed on the tow ball rod;

wherein the tow ball hitch is connected to the tow ball body by the at least one plunger, and the tow ball hitch is fixedly connected to the tow arm;

wherein the at least one tow ball comprises a first tow ball and a second tow ball, the first tow ball is disposed on an end of the tow ball rod, and the second tow ball is disposed on another end of the tow ball rod; and wherein the tow ball hitch defines a through hole, a diameter of the tow ball rod corresponds to a size of the through hole, an inner wall of the tow ball hitch surrounding the through hole defines at least one round hole, a position of the at least one plunger corresponds to a position of the at least one round hole, and the tow ball body passes through the through hole and is connected to the tow ball hitch by the at least one plunger.

2. The tow hook device as claimed in claim 1, wherein the at least one plunger comprises a first plunger and a second plunger, and the first plunger and the second plunger are respectively disposed on two sides of the tow ball rod.

3. The tow hook device as claimed in claim 2, wherein the first plunger comprises a first spring inside and the second plunger comprises a second spring inside.

4. The tow hook device as claimed in claim 3, wherein the tow ball hitch comprises a clamping jaw disposed at a front end of the tow ball hitch, and the tow ball hitch is connected to the tow arm by the clamping jaw.

5. The tow hook device as claimed in claim 4, wherein the tow ball hitch is provided with at least one latch, and the tow ball hitch is fixedly connected to the tow arm by the at least one latch.

6. The tow hook device as claimed in claim 5, wherein the tow hook device further comprises a latch cover, and the at least one latch is disposed on the latch cover.

7. The tow hook device as claimed in claim 6, wherein a number of the at least one latch is in a range of 1-3, and the latch cover is provided with a lock body.

8. The tow hook device as claimed in claim 7, wherein the tow ball arm is provided with a receiver latch lock.

9. The tow hook device as claimed in claim 6, wherein the tow hook device further comprises another latch cover, the latch cover and the another latch cover are respectively disposed on two sides of the tow ball hitch, the latch cover is fixedly connected with the tow ball hitch through the at least one latch, and the another latch cover is fixedly connected with the tow ball hitch through a screw.

* * * * *